Aug. 12, 1930.   A. E. ANDERSON   1,773,022
CONTROL SYSTEM
Filed July 23, 1928

Inventor:
Arvid E. Anderson,
by Charles E. Mullan
His Attorney.

Patented Aug. 12, 1930

1,773,022

UNITED STATES PATENT OFFICE

ARVID E. ANDERSON, OF LANSDOWNE, PENNSYLVANIA, ASSIGNOR TO GENERAL ELECTRIC COMPANY, A CORPORATION OF NEW YORK

CONTROL SYSTEM

Application filed July 23, 1928. Serial No. 294,857.

My invention relates to control systems for selectively controlling the closing of a circuit breaker connecting together two electric circuits so that the circuit breaker can be closed whenever either of the two circuits is energized. My invention relates particularly to a circuit breaker control system in which the circuit breaker is normally arranged to be reclosed whenever the voltage across one of these circuits is restored to a predetermined value and remains above this predetermined value for a predetermined time after the opening of the circuit breaker.

One object of my invention is to provide an improved control arrangement whereby the reclosing means associated with the circuit breaker is operative to reclose the circuit breaker automatically after it opens when the closing means is energized from one of the circuits and is prevented from automatically reclosing the circuit breaker in response to the opening of the circuit breaker when the closing means is energized from the other circuit.

My invention will be better understood from the following description taken in connection with the accompanying drawing and its scope will be pointed out in the appended claims.

Figure 1:
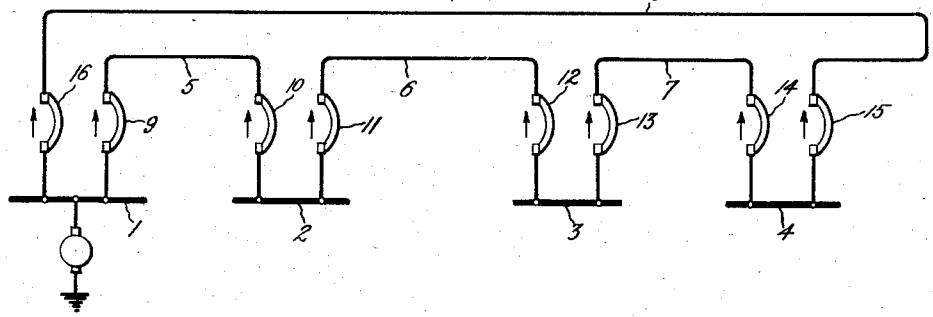
Figure 2:
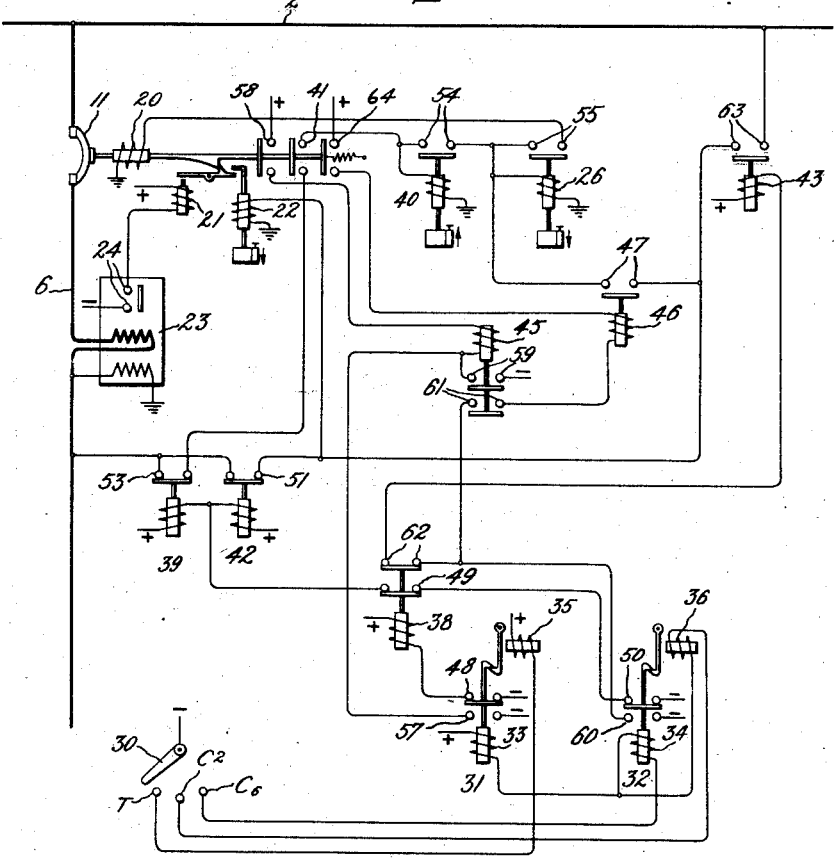

In the accompanying drawing Fig. 1 is a one line diagram of a system of distribution to which my invention is particularly applicable and Fig. 2 is a diagram of a control system for a circuit breaker embodying my invention.

Referring to Fig. 1, 1 is a supply bus and 2, 3 and 4 are sectionalizing buses which are connected in a loop by the feeders 5, 6, 7 and 8. The feeder 5 which interconnects the buses 1 and 2 has a circuit breaker 9 therein adjacent to the bus 1 and the circuit breaker 10 adjacent to the bus 2. Similarly, the feeder 6 which interconnects the buses 2 and 3 has a circuit breaker 11 therein adjacent to the bus 2 and a circuit breaker 12 adjacent to the bus 3; the feeder 7, which interconnects the buses 3 and 4, has a circuit breaker 13 therein adjacent to the bus 3 and the circuit breaker 14 adjacent to the bus 4, and the feeder 8 which interconnects the buses 4 and 1 has a circuit breaker 15 therein adjacent to the bus 4 and a circuit breaker 16 adjacent to the bus 1.

Suitable selective means, examples of which are well known in the art, may be provided whereby a fault on any feeder can effect only the opening of the circuit breakers in the faulty feeder. For example, if a fault should occur in the feeder 7 only the circuit breakers 13 and 14 would be opened whereas if the fault should occur on the feeder 6 only the circuit breakers 11 and 12 would be opened. One well known way of obtaining this selective action is to provide each circuit breaker with means for effecting the opening thereof when the power flow through it is of a certain value and duration and in the direction shown by the arrows adjacent to the circuit breakers in Fig. 1.

In order to maintain continuity of service it is very desirable to be able to connect the closing means of each circuit breaker to the adjacent sectionalizing bus so that when the breaker is open, and the bus is energized, the circuit breaker can be reclosed by connecting the closing means thereof to the sectionalizing bus. In order that the circuit breaker at the other end of the feeder may be automatically reclosed when the voltage is restored to the feeder by the closing of the circuit breaker at one end thereof it is also desirable to have the control arrangement for each circuit breaker arranged so that it can automatically reclose the circuit breaker whenever the voltage of the circuit is restored to a predetermined value and remains above this predetermined value for a predetermined time. In accordance with my invention I provide an arrangement for controlling the circuit breakers 10, 11, 12, 13, 14 and 15 in Fig. 1 so that they can be closed when either the adjacent sectionalizing bus or the adjacent feeder is energized.

The control arrangements for closing the other circuit breakers of the systems shown in Fig. 1 may be of any suitable type examples of which are well known in the art. For example they may be arranged in any suitable manner so as to be reclosed automatically whenever the station bus 1 is energized.

Fig. 2 shows a control arrangement for a circuit breaker which embodies my invention and which may be used for controlling the circuit breakers 10 to 15 inclusive in Fig. 1. For the purpose of this description it will be assumed that the circuit breaker shown in Fig. 2 is the circuit breaker 11 of Fig. 1 and connects the sectionalizing bus 2 to the feeder 6.

As shown in Fig. 2 the circuit breaker 11 is of the well known latched-in type and comprises a closing coil 20 which when energized closes the circuit breaker 11, a trip coil 21 which when energized effects the opening of the circuit breaker 11 and an undervoltage magnet 22 which when deenergized effects the opening of the circuit breaker 11. It is obvious that the circuit breaker 11 may be of any other suitable type examples of which are well known in the art. For effecting the opening of the circuit breaker 11 when an excessive amount of power flows from the bus 2 to the feeder 6, I provide a power directional relay 23 which is so connected to the feeder 6 that it closes the contacts 24 of the relay 23, and thereby completes the circuit of trip coil 21 when a predetermined amount of power flows from the bus 2 through the circuit breaker 11 to the feeder 6.

The circuit of the closing coil 20 of the circuit breaker 11 is controlled by a voltage relay 26 which when energized a predetermined amount effects the energization of the closing coil 20 and the closing of the circuit breaker 11. In accordance with my invention I provide an improved control arrangement whereby the relay 26 can be selectively connected across either the bus 2 or the feeder 6 so that the circuit breaker can be closed when either of these circuits is energized. In accordance with my invention I provide a selector switch 30 which may be of any suitable type for selectively controlling the connections of the relay 26. This selector switch 30 may be controlled in any suitable manner either manually or automatically. For example the selector switch may constitute a part of any well known type of supervisory system whereby a load dispatcher at a remote point may effect the automatic movement of the selector switch to any of its operating positions without effecting the completion of any circuits as it moves through any of the intermediate operating positions.

As shown in the drawing the switch 30 has three operating positions, a trip position T and two closing positions $C_2$ and $C_6$. When the switch 30 is moved to its trip position T, the undervoltage magnet 22 is deenergized so that the circuit breaker 11 is opened. When the switch 30 is moved to its closing position $C_6$ the voltage relay 26 is arranged to be connected across the feeder 6 whenever the circuit breaker 11 is open, so that the circuit breaker is automatically closed when the feeder 6 is reenergized. When the switch 30 is moved into its closing position $C_2$ after first having been moved to its trip position T, relay 26 is arranged to be connected across the bus 2. If, however, the circuit breaker opens after the switch 30 has been to its closing position $C_2$, the relay 26 is not reconnected to the bus by the opening of the circuit breaker but remains disconnected from the bus 2 until the selector switch 30 is first moved to its trip position T and then back to the closing position $C_2$. In this manner I prevent "pumping" of the circuit breaker in case the circuit breaker 11 is closed in response to the energization of the bus 2 when there is a fault on the feeder 6.

In the particular embodiment of my invention shown in the drawing the control apparatus associated with the selector switch 30 for performing the above mentioned functions when the selector switch is moved to its various operating positions include two relays 31 and 32, the respective actuating coils 33 and 34 of which are arranged to be simultaneously energized when the selector switch is moved to its closing position $C_6$. The relays 31 and 32 are of the lockout type which remain in their energized positions after their respective actuating coils are deenergized. As shown, the relays 31 and 32 remain in their energized positions until the respective reset coils 35 and 36 are energized.

The selector switch 30 when moved to its trip position T is arranged to effect the energization of the reset coil 35 of the relay 31 so that the relay 31 is restored to its deenergized position. The relay 31, when in its deenergized position, effects the deenergization of the undervoltage magnet 22 so that the circuit breaker 11 is opened if it is closed at the time relay 31 is moved to its deenergized position.

When the selector switch 30 is moved to its closing position $C_2$ the actuating coil 33 of the relay 31 and reset winding 36 of the relay 32 are simultaneously energized so that the relay 31 is moved to its energized position and the relay 32 is moved to its deenergized position.

Associated with the relay 31 is an auxiliary relay 38 which is arranged to be energized when the relay 31 is in its energized position. When the relays 32 and 38 are simultaneously in their energized positions a circuit is completed for relay 39 which, when energized, is arranged to connect the winding of a time relay 40 and the auxiliary contacts 41 on the circuit breaker 11 in series across the feeder 6. The time relay 40 in turn is arranged to connect the coil of the voltage relay 26 across the feeder 6 if the voltage across the feeder 6 remains above a predetermined value for a predetermined time while the circuit breaker is open. Therefore, whenever the relays 31 and 32 are simultaneously in their energized positions, which is the positions they are in after the selector switch has been moved to its closing position $C_6$ the circuit breaker 11 is arranged to be automatically reclosed whenever the feeder 6 is reenergized.

Whenever the relays 38 and 32 are simultaneously in their energized positions a circuit is also completed for a relay 42 which, when energized, connects the coil of the undervoltage magnet 22 across the feeder 6. Therefore, whenever both of the relays 31 and 32 are in their energized position, the undervoltage magnet 22 is also energized in response to the voltage across the feeder 6.

In order to close the circuit breaker 11 when only the bus 2 is energized I also provide an arrangement for connecting the voltage relay 26 across the bus 2. This arrangement includes a relay 43 which is arranged to be energized when the relay 38 is in its energized position and the relay 32 is in its deenergized position which are the positions these relays are in when the selector switch 30 is in its closing position $C_2$. The relay 43 when energized closes contacts 63 in the circuit of the relay 26 across the bus 2. The relay 26, however, is arranged to be connected across the bus 2 only after the control switch 30 has first been moved to its tripping position T and then to its closing position $C_2$. For accomplishing this result I provide a relay 45 which is so connected that the energizing circuit thereof is completed only when the circuit breaker 11 is open and the relay 31 is in its deenergized position. Since the relay 31 can be moved to its deenergized position only by moving the selector switch 30 to its trip position T the energizing circuit for relay 45 can be completed only by first moving the switch 30 to its trip position T. The relay 45 in turn controls the circuit of an auxiliary relay 46 which is arranged to be energized only when the relay 45 is energized, the circuit breaker 11 is open and the relay 32 is in its deenergized position. Relay 46 when energized closes contacts 47 in the circuit of the voltage relay 26 across the bus 2.

Since the relays 45 and 46 are deenergized whenever the circuit breaker 11 is closed it will be observed that after the circuit breaker 11 has been closed by connecting the relay 26 across the bus 2 it is necessary, in order to reconnect the voltage relay 26 across the bus 2 again, to first move the selector switch 30 to its trip position T to effect the energization of the relays 45 and 46 and then to its closing position to effect the energization of the relay 43.

The operation of the arrangement shown in the drawing is as follows:

During the normal operation of the system the relays 31 and 32 are maintained in their energized positions so that circuit breaker 11 is arranged to be reclosed in response to the energization of the feeder 2 in case the breaker 11 opens for any reason. These relays 31 and 32 may be moved to their energized positions by moving the selector switch 30 to its closing position $C_6$ so that the actuating coils 33 and 34 are connected in series across a suitable source of control current. When the relay 31 is in its energized position, a circuit is completed for the coil of the relay 38 through the contacts 48 of the relay 31. When the relays 34 and 38 are simultaneously in their energized positions the relays 39 and 42 are energized. The circuit for relays 39 and 42, the coils of which are connected in parallel, includes the contacts 49 of the relay 38 and the contacts 50 of the relay 32. The coil of the undervoltage release magnet 22 is connected across the feeder 6 through contacts 51 of the relay 42.

As long as the voltage across the feeder 6 remains above a predetermined value and the current flowing from the bus 2 to the feeder 6 does not exceed a predetermined value the switch 11 remains closed. When, however, the voltage across the feeder 6 decreases below a predetermined value so that the undervoltage release magnet 22 becomes deenergized or a fault occurs on the feeder 6 so that the power directional relay 23 closes its contacts 24, the circuit breaker 11 is opened. The switch 11 by closing its auxiliary contacts 41 connects the coil of the time relay 40 across the feeder 6. The circuit of the time relay 40 also includes the contacts 53 of the relay 39. When the voltage across the feeder 6 exceeds a predetermined value for a predetermined time interval the time relay 40 closes its contacts 54 and connects the coil of the voltage relay 26 and the contacts 53 and 41 in series across the feeder 6. The voltage relay 26 by closing its contacts 55 connects the closing coil 20 in series with the contacts 41, 53 and 54 across the feeder so that the circuit breaker 11 is reclosed.

When the circuit breaker 11 is open and the bus 2 is energized and it is desired to close the circuit breaker from the bus 2, the selector switch 30 is first moved to its trip position T in which position a circuit is completed for the reset winding 35 of the relay 31 so that the relay 31 moves to its deenergized position. When the relay 31 is in its deenergized position so that its contacts 57 are closed, and the circuit breaker 11 is open so that its auxiliary contacts 58 are closed, an energizing circuit is completed for the coil of the relay 45. Relay 45 by closing its contacts 59 completes a locking circuit for itself which is independent of the contacts 57 of the relay 31 so that relay 45 is not deenergized by the subsequent energization of the actuating coil 33 of the relay 31. The selector switch 30 is then moved from its tripping position T to its closing position $C_2$, in which position a circuit is completed through the actuating coil 33 of the relay 31 and the reset winding 36 of the relay 32. The relay 32 when in its deenergized position closes its contacts 60 and completes a circuit for the coil of the relay 46 through contacts 61 of the relay 45 and the auxiliary contacts 64 on the circuit breaker 11 if the relay 45 is energized and the circuit breaker is open. The closing of the contacts 60 of the relay 32 also completes through the contacts 62 of the relay 38 associated with the relay 31 a circuit for the relay 43. When both of the relays 43 and 46 are energized the coil of the voltage relay 26 is connected across the bus 2 by means of series connected contacts 47 and 63 of the relays 46 and 43 respectively. The undervoltage magnet 22 is also connected across the bus 2 through the contacts 63 of relay 43.

When the voltage across the bus 2 exceeds a predetermined value the voltage relay 26 closes its contacts 55 and connects the closing coil 20 and the contacts 47 and 63 in series across the bus 2. As soon as the circuit breaker 11 closes the above traced circuit of the relays 45 and 46 is opened at the auxiliary contacts 58 and 64 respectively so that when the circuit breaker opens due to a fault on the feeder 6 while relay 31 is in its energized position and the relay 32 is deenergized the circuit breaker is not automatically reclosed in response to the energization of the bus 2. It will be observed that in order to close the breaker 11 again in response to the energization of the bus 2 it is necessary to move the selector switch 30 first to its tripping position T in order to effect the reenergization of the relays 45 and 46 which were deenergized by the closing of the circuit breaker 11, and then to its closing position $C_2$ in order to effect the energization of the relays 43.

While I have in accordance with the patent statutes shown and described my invention as applied to a particular system and as embodying various devices diagrammatically indicated, changes and modifications will be obvious to those skilled in the art and I therefore aim in the appended claims to cover all such changes and modifications as fall within the true spirit and scope of my invention.

What I claim as new and desire to secure by Letters Patent of the United States, is:

1. In combination, two electric circuits, a circuit breaker for connecting said circuits together, means responsive to the current through said circuit breaker for opening said circuit breaker, means including a voltage responsive relay for closing said circuit breaker when said relay is energized a predetermined amount, and means including a selector switch for effecting the opening of said circuit breaker when said selector switch is in a predetermined position and for effecting the connection of said relay across a predetermined one of said circuits whenever said circuit breaker is open and said selector switch is moved to a predetermined position and for effecting the connection of said relay across the other of said circuits while said circuit breaker is open only after said selector switch has first been moved to its opening position and subsequently moved to another position.

2. In combination, two electric circuits, a circuit breaker for connecting said circuits together, means responsive to the current through said circuit breaker for opening said circuit breaker, means including a voltage relay for closing said circuit breaker when said relay is energized a predetermined amount, a selector switch, means including said selector switch for connecting said voltage relay across one of said circuits whenever said circuit breaker is open and said selector switch is moved to a predetermined position, means including said selector switch for effecting the opening said circuit breaker when said switch is moved to a predetermined position while the circuit breaker is closed, and means including the selector switch for effecting the connection of said relay across the other of said circuits only when said circuit breaker is open and said selector switch is first moved to its opening position and subsequently to another predetermined position.

3. In combination, two electric circuits, a circuit breaker for connecting said circuits together, means responsive to the current through said circuit breaker for opening said circuit breaker, means including a voltage relay for closing said circuit breaker when said relay is energized a predetermined amount, a selector switch having a trip position and two closing positions, means controlled by said switch for effecting the opening of said circuit breaker when said switch is moved to its trip position and the connection of said voltage relay across one of said circuits when said switch is moved to one of its closing positions and across the other of said circuits when said switch is moved to the other of its closing positions, and means controlled by said switch for effecting the automatic reconnection of said relay across said one of said circuits, by the opening of said circuit breaker when said switch was last moved to said one of said closing positions and for preventing the automatic reconnection of said relay across said other of said circuit by the opening of said circuit breaker when said switch was last moved to said other closing position.

4. In combination, two electric circuits, a circuit breaker for connecting said circuits together, means responsive to the current through said circuit breaker for opening said circuit breaker, means including a voltage relay for closing said circuit breaker when said relay is energized a predetermined amount, a selector switch having a trip position and two closing positions, means controlled by said switch and the position of said circuit breaker for connecting said voltage relay across one of said circuits whenever said switch is moved to one of its closing positions and said circuit breaker remains open for a predetermined time, means controlled by said switch for effecting the opening of said switch when said switch is moved to its trip position while said circuit breaker is closed, and means controlled by said switch and the position of said circuit breaker for effecting the connection of said relay across the other of said circuits only when said circuit breaker is open and said switch is first placed in its trip position and then in the other of said two closing positions.

5. In combination, a bus, a feeder, a circuit breaker for connecting said bus to said feeder, power directional means for effecting the opening of said circuit breaker only when power flows from said bus to said feeder, means including a voltage relay for closing said circuit breaker when said relay is energized a predetermined amount, a selector switch, means controlled by said selector switch for effecting the opening of said circuit breaker, means controlled by said switch and the position of said circuit breaker for connecting said relay across said feeder circuit whenever said switch is moved to a predetermined position and said circuit breaker is open, and means controlled by said switch for connecting said relay across said bus only when said switch is first moved to said trip position and then to another position.

In witness whereof, I have hereunto set my hand this 20th day of July, 1928.

ARVID E. ANDERSON.